US012191581B2

(12) United States Patent
Zhang et al.

(10) Patent No.: US 12,191,581 B2
(45) Date of Patent: Jan. 7, 2025

(54) ANTENNA, MANUFACTURING METHOD THEREOF AND COMMUNICATION SYSTEM

(71) Applicants: Beijing BOE Technology Development Co., Ltd., Beijing (CN); BOE TECHNOLOGY GROUP CO., LTD., Beijing (CN)

(72) Inventors: Dongdong Zhang, Beijing (CN); Yali Wang, Beijing (CN); Qianhong Wu, Beijing (CN); Yafei Zhang, Beijing (CN); Mengwen Jia, Beijing (CN); Feng Qu, Beijing (CN); Biqi Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/785,578

(22) PCT Filed: Aug. 30, 2021

(86) PCT No.: PCT/CN2021/115201

§ 371 (c)(1),
(2) Date: Jun. 15, 2022

(87) PCT Pub. No.: WO2023/028727

PCT Pub. Date: Mar. 9, 2023

(65) Prior Publication Data

US 2024/0195069 A1 Jun. 13, 2024

(51) Int. Cl.

*H01Q 9/04* (2006.01)
*H01Q 1/24* (2006.01)

(Continued)

(52) U.S. Cl.

CPC ............ *H01Q 9/0407* (2013.01); *H01Q 1/24* (2013.01); *H01Q 1/246* (2013.01); *H01Q 9/04* (2013.01);

(Continued)

(58) Field of Classification Search

CPC .. H01Q 9/0407; H01Q 1/246; H01Q 21/0075; H01Q 21/065; H01Q 21/08; H01Q 9/04; H01Q 1/24; H01Q 21/00

See application file for complete search history.

(56) References Cited

U.S. PATENT DOCUMENTS 5,510,803 A 4/1996 Ishizaka et al.
2007/0126638 A1* 6/2007 Channabasappa ... H01Q 9/0407 343/700 MS (Continued)

FOREIGN PATENT DOCUMENTS

CN 203134975 U 8/2013
CN 206992300 U 2/2018

(Continued)

OTHER PUBLICATIONS

Ko et al., "Dual-Band Circularly Polarized Patch Antenna With First Positive and Negative Modes," IEEE Antennas and Wireless Propagation Letters, 2013, vol. 12, pp. 1165-1168.

(Continued)

*Primary Examiner* — Hai V Tran

(74) *Attorney, Agent, or Firm* — HOUTTEMAN LAW LLC

(57) ABSTRACT

An antenna includes: a dielectric layer; a first electrode on the dielectric layer and having at least one first opening; at least one radiation structure on a side of the dielectric layer away from the first electrode, wherein an orthographic projection of each radiation structure on the dielectric layer is within an orthographic projection of one first opening on (Continued)

the dielectric layer; at least one first feeding line and at least one second feeding line, which are on the side of the dielectric layer away from the first electrode, wherein each radiation structure is electrically connected to one first feeding line and one second feeding line, taking a straight line in a length direction of the antenna and passing through a center of the first opening as a symmetry axis, the first feeding line and the second feeding line, connected to a same radiation structure, are symmetrical to each other.

18 Claims, 12 Drawing Sheets

(51) Int. Cl.
*H01Q 21/00* (2006.01)
*H01Q 21/06* (2006.01)
*H01Q 21/08* (2006.01)

(52) U.S. Cl.
CPC ......... *H01Q 21/00* (2013.01); *H01Q 21/0075* (2013.01); *H01Q 21/065* (2013.01); *H01Q 21/08* (2013.01)

(56) References Cited

U.S. PATENT DOCUMENTS

2009/0174613 A1* 7/2009 Liu ........................ H01Q 1/243 343/702
2011/0057853 A1* 3/2011 Kim ..................... H01Q 9/0442 343/846
2016/0141757 A1 5/2016 Lai et al.
2022/0140482 A1* 5/2022 Lee ...................... H05K 1/0243 343/905

FOREIGN PATENT DOCUMENTS

CN 208706878 U 4/2019
CN 110600858 A 12/2019
CN 110676576 A 1/2020
CN 110808448 A 2/2020
CN 111740217 A 10/2020

OTHER PUBLICATIONS

Korkontzila et al., "Dual Frequency Microstrip Patch Antenna, Reduced in Size by Use of Triangularly Arranged Peripheral Slits," Conference Paper, 2006, Proc. European Conference on Antennas and Propagation.
Song, Chang Hong, "Research on Dual Polarization Microstrip Antenna Array," Master's Dissertation, Jun. 2006, Harbin Institute of Technology, Heilongjiang, China.

* cited by examiner

ANTENNA, MANUFACTURING METHOD THEREOF AND COMMUNICATION SYSTEM

TECHNICAL FIELD

The present disclosure belongs to the technical field of communication, and particularly relates to an antenna, a manufacturing method thereof and a communication system.

BACKGROUND

Compared with 4G (the 4th generation mobile communication technology), 5G (the 5th generation mobile communication technology) has the advantages of higher data rate, larger network capacity, lower time delay and the like. A 5G frequency plan includes two parts, namely, a low frequency band and a high frequency band, wherein the low frequency band (3 GHz to 6 GHz) has good propagation characteristics and very abundant spectrum resources, so that development of an antenna unit and an array applied for the low frequency band communication gradually becomes a research and development hotspot at present.

Based on practical application scenarios of 5G mobile communication, a 5G low frequency band antenna should have technical features such as high gain, miniaturization, and wide frequency band. A microstrip antenna is a commonly used antenna form which has a simple structure, is easy to form an array and can realize high gain, but an application of the microstrip antenna in 5G low frequency mobile communication is restricted due to its narrow bandwidth and its large antenna size at a low frequency band.

SUMMARY

The present disclosure aims to solve at least one technical problem in the prior art and provides an antenna, a manufacturing method thereof and a communication system.

In a first aspect, an embodiment according to the present disclosure provides an antenna, which includes:

- a dielectric layer;
- a first electrode on the dielectric layer and with at least one first opening therein;
- at least one radiation structure on a side of the dielectric layer away from the first electrode, wherein an orthographic projection of each of the at least one radiation structure on the dielectric layer is within an orthographic projection of one of the at least one first opening on the dielectric layer; and
- at least one first feeding line and at least one second feeding line, which are on the side of the dielectric layer away from the first electrode, wherein each of the at least one radiation structure is electrically connected to one of the at least one first feeding line and one of the at least one second feeding line,
- wherein taking a straight line which passes through a center of the first opening and is parallel to a plane where the first electrode is located as a symmetry axis, the first feeding line and the second feeding line, which are connected to a same radiation structure, are symmetrical to each other.

At least one of the first feeding line and the second feeding line is a microstrip line, and feeding directions of the first feeding line and the second feeding line differ by 90°.

The first feeding line and the second feeding line each include a connecting portion and a plurality of branch portions connected to the connecting portion, and the plurality of branch portions of the first feeding line and the plurality of branch portions of the second feeding line each are connected to the radiation structure.

Orthographic projections of the first feeding line and the second feeding line on the dielectric layer each at least partially overlap an orthographic projection of the first opening on the dielectric layer; and orthographic projections of the plurality of branch portions of the first feeding line and the plurality of branch portions of the second feeding line on the dielectric layer each are within the orthographic projection of the first opening on the dielectric layer.

The radiation structure includes a first radiating element and a second radiating element spaced apart from each other; taking a straight line which is in a length direction of the antenna and passes through the center of the first opening as a symmetry axis, the first radiating element and the second radiating element in one of the at least one radiation structure are symmetrical to each other; and

- each of the at least one first feeding line is connected to the first radiating element, and each of the at least one second feeding line is connected to the second radiating element.
- the first radiating element and the second radiating element each are of a triangular patch structure.

The radiation structure includes a first radiating element, a second radiating element, a third radiating element and a fourth radiating element spaced apart from each other; taking a straight line which is in a length direction of the antenna and passes through the center of the first opening as a symmetry axis, the first radiating element and the second radiating element in one of the at least one radiation structure are symmetrical to each other, and the third radiating element and the fourth radiating element in one of the at least one radiation structure are symmetrical to each other; taking a straight line which is in a width direction of the antenna and passes through the center of the first opening as a symmetry axis, the first radiating element and the third radiating element in one of the at least one radiation structure are symmetrical to each other, and the second radiating element and the fourth radiating element in one of the at least one radiation structure are symmetrical to each other;

- each of the at least one first feeding line is connected to the first radiating element, and each of the at least one second feeding line is connected to the second radiating element; or, each of the at least one first feeding line is connected to the third radiating element, and each of the at least one second feeding line is connected to the fourth radiating element.
- the first radiating element, the second radiating element, the third radiating element, and the fourth radiating element are each of a triangular patch structure.

The radiation structure has a rectangular outline, and the first opening is a rectangular opening.

The antenna further includes a first feeding structure and a second feeding structure, each on the side of the dielectric layer away from the first electrode, wherein the first feeding structure is electrically connected to the at least one first feeding line, and the second feeding structure is electrically connected to the at least one second feeding line.

The first feeding structure is in a same layer as and is electrically connected to the at least one first feeding line; the second feeding structure is in a same layer as and is electrically connected to the at least one second feeding line.

Taking a straight line which is in a length direction of the antenna and passes through the center of the first opening as a symmetry axis, the first feeding structure and the second feeding structure are symmetrical to each other.

The at least one first opening include $2^n$ number of the first openings, the first feeding structure includes n stages of third feeding lines, and the second feeding structure includes n stages of fourth feeding lines;

one third feeding line at a $1^{st}$ stage is connected to two adjacent first feeding lines, and the first feeding lines connected to different third feeding lines at the $1^{st}$ stage are different; one third feeding line at an $m^{th}$ stage is connected to two adjacent third feeding lines at an $(m-1)^{th}$ stage, and the third feeding lines at the $(m-1)^{th}$ stage connected to different third feeding lines at the $m^{th}$ stage are different;

one fourth feeding line at a $1^{st}$ stage is connected to two adjacent second feeding lines, and the second feeding lines connected to different fourth feeding lines at the $1^{st}$ stage are different; one fourth feeding line at an $m^{th}$ stage is connected to two adjacent fourth feeding lines at an $(m-1)^{th}$ stage, and the fourth feeding lines at the $(m-1)^{th}$ stage connected to different fourth feeding lines at the $m^{th}$ stage are different; wherein n is greater than or equal to 2, m is greater than or equal to 2 and less than or equal to n, and both m and n are integers; and at least one of the third feeding line and the fourth feeding line is a microstrip line.

The antenna is divided into a feeding region and a radiation region; the first feeding structure and the second feeding structure are in the feeding region; the at least one radiation structure is in the radiation region; the first electrode further has at least one second opening in the feeding region; and an orthographic projection of the at least one second opening on the dielectric layer does not overlap orthographic projections of the first feeding structure and the second feeding structure on the dielectric layer.

The dielectric layer is of a single layer structure, and a material of the dielectric layer includes polyimide or polyethylene terephthalate.

The dielectric layer includes a first dielectric sub-layer, a first adhesive layer, and a second dielectric sub-layer which are stacked together; and the first electrode is on a side of the first dielectric sub-layer away from the first adhesive layer; the second electrode is arranged on a side of the first adhesive layer close to the first dielectric sub-layer; and the radiation structure is on a side of the second dielectric sub-layer away from the first adhesive layer.

A material of the first dielectric sub-layer and/or the second dielectric sub-layer includes polyimide or polyethylene terephthalate.

In a second aspect, an embodiment of the present disclosure provides a method for manufacturing an antenna, including:

providing a dielectric layer;

forming a pattern including a first electrode on a side of the dielectric layer through a patterning process, wherein a first opening is formed in the first electrode; and forming at least one radiation structure, at least one first feeding line and at least one second feeding line on a side of the dielectric layer opposite to the first electrode, wherein each of the at least one radiation structure is electrically connected to one of the at least one first feeding line and one of the at least one second feeding line;

wherein taking a straight line which is in a length direction of the antenna and passes through a center of the first opening as a symmetry axis, the first feeding line and the second feeding line, which are connected to a same radiation structure, are symmetrical to each other.

In a third aspect, an embodiment of the present disclosure provides a communication system, which includes any one of the antennas described above.

The communication system further includes:

a transceiving unit configured to transmit or receive a signal;

a radio frequency transceiver, which is connected to the transceiving unit and configured to modulate the signal transmitted by the transceiving unit or demodulate a signal received by the antenna and then transmit the signal to the transceiving unit;

a signal amplifier, which is connected to the radio frequency transceiver and configured to improve a signal-to-noise ratio of the signal output by the radio frequency transceiver or the signal received by the antenna;

a power amplifier, which is connected to the radio frequency transceiver and configured to amplify a power of the signal output by the radio frequency transceiver or the signal received by the antenna; and a filtering unit, which is connected to the signal amplifier, the power amplifier and the antenna, and configured to filter the received signal and then transmit the filtered signal to the antenna or filter the signal received by the antenna.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first," "second," and the like in the present disclosure is not intended to indicate any order, quantity, or importance, but rather serves to distinguish one element from another. Also, the use of the terms "a," "an," or "the" and the like does not denote a limitation of quantity, but rather denotes the presence of at least one. The word "comprising" or "comprises", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may also be changed accordingly.

Figure 1:
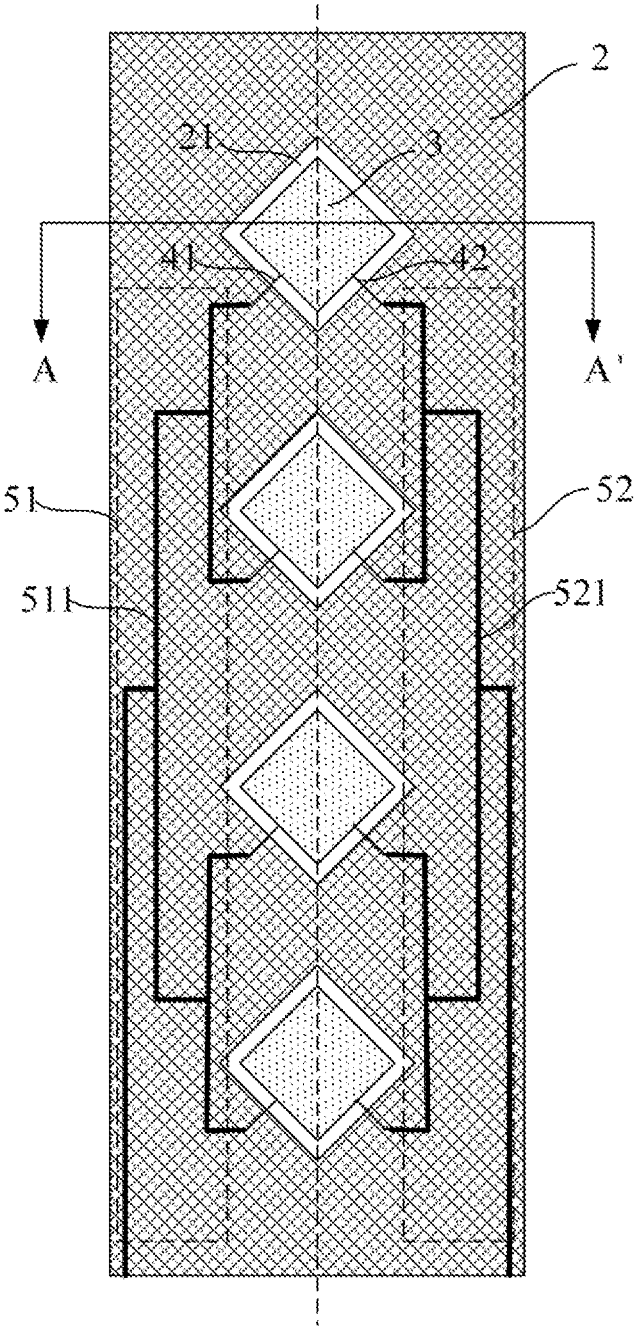
FIG. 1 is a top view of an antenna in an embodiment of the present disclosure.
Figure 2:
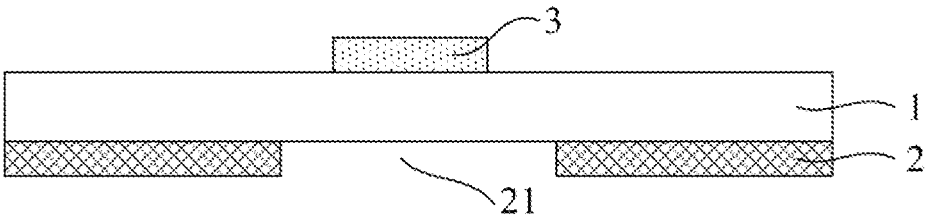
FIG. 2 is a partial cross-sectional view of the antenna shown in FIG. 1 taken along A-A'.

FIG. 1 is a top view of an antenna in an embodiment of the present disclosure; FIG. 2 is a partial cross-sectional view of the antenna shown in FIG. 1 taken along line A-A'. In a first aspect, as shown in FIGS. 1 and 2, the present disclosure provides an antenna including a dielectric layer 1, a first electrode 2, at least one radiation structure 3, at least one first feeding line 41, and at least one second feeding line 42.

The dielectric layer 1 includes a first surface and the second surface opposite to each other in a thickness direction of the dielectric layer 1. The first electrode 2 is arranged on the dielectric layer 1, and the first electrode 2 has at least one first opening 21 therein. The radiation structure 3, the first feeding line 41 and the second feeding line 42 are all located on a different side of the dielectric layer 1 from the first electrode 2. An orthographic projection of each radiation structure 3 on the dielectric layer 1 is within an orthographic projection of one first opening 21 on the dielectric layer 1. For example, where a plurality of the radiation structures 3 are present, there are also a plurality of the first openings 21, the radiation structures 3 may be arranged in a one-to-one correspondence with the first openings 21. It should be noted that the first electrode 2 may be a ground electrode layer, that is, a potential written to the first electrode 2 is a ground potential. In FIG. 1, the number of the first openings 21 is four as an example, but the number of the first openings 21 is not limited to four, and may be specifically set according to a size of the antenna. The same applies to the number of radiation structures 3.

One radiation structure 3 is fed by one first feeding line 41 and one second feeding line 42, i.e., one radiation structure 3 is electrically connected to one first feeding line 41 and one second feeding line 42. For example, where a plurality of the radiation structure 3 are present, correspondingly, there are also a plurality of the first feeding lines 41 and a plurality of the second feeding lines 42, in this case, the first feeding lines 41 and the second feeding lines 42 are both arranged in one-to-one correspondence with the radiation structures 3. In particular, in an embodiment of the present disclosure, taking a straight line passing through a center of the first opening 21 and parallel to a plane where the first electrode 2 is located as a symmetry axis, the first feeding line 41 and the second feeding line 42 connected to a same radiation structure 3 are symmetrical to each other. For example, the first openings 21 are arranged side by side along a length direction of the first electrode, and in this case, a straight line which passes through the center of the first openings 21 and is parallel to the plane where the first electrode 2 is located may be a straight line which passes through the center of the first openings 21 in a length direction of the first electrode 2, and taking this straight line as a symmetry axis, the first feeding line 41 and the second feeding line 42 connected to a same radiation structure 3 are symmetrical to each other. In this case, in the embodiment of the present disclosure, the feeding directions of the first feeding line 41 and the second feeding line 42 are different, that is, polarization directions are different, and the antenna is a dual-polarized antenna. It should be noted that the feeding direction of the first feeding line 41 is a direction in which a first microwave signal is fed into the radiation structure 3 after being excited at an input port of the first microwave signal, and the feeding direction of the second feeding line 42 is a direction in which a second microwave signal is fed into the radiation structure 3 after being excited at an input port of the second microwave signal.

In the antenna provided in the embodiment of the present disclosure, the first opening 21 is arranged in the first electrode 2, and the radiation structure 3 is formed at a position corresponding to the opening, and taking a straight line that is in the length direction of the antenna and passes through the center of the first opening 21 as a symmetry axis, the first feeding line 41 and the second feeding line 42 connected to a same radiation structure 3 are symmetrical to each other, that is, two polarizations of the antenna are symmetrical to each other, which helps to reduce performance difference between feeding ports of the first feeding line 41 and the second feeding line 42.

In some examples, at least one of the first feeding line 41 and the second feeding line 42 is a microstrip line. In an embodiment of the present disclosure, both the first feeding line 41 and the second feeding line 42 are microstrip lines as an example. Further, the feeding directions of the first feeding line 41 and the second feeding line 42 differ by 90°. For example, one of the first feeding line 41 and the second feeding line 42 has a feeding direction of +45°, and the other has a feeding direction of −45°. As shown in FIG. 1, the feeding direction of the first feeding line 41 is +45°, and the feeding direction of the second feeding line 42 is −45°. Alternatively, if the antenna shown in FIG. 1 is rotated by 90°, the feeding direction of the first feeding line 41 is 0°, and the feeding direction of the second feeding line 42 is 90°. In the embodiments of the present disclosure, as an example, the feeding direction of the first feeding line 41 is +45°, and the feeding direction of the second feeding line 42 is −45°, in which case the antenna is a ±45° polarized antenna.

In some examples, as shown in FIG. 1, the dielectric layer 1 in the antenna includes, but is not limited to, a flexible material. For example, the dielectric layer 1 is made of Polyimide (PI) or polyethylene terephthalate (PET). Alternatively, the dielectric layer 1 may be glass-based. In some examples, where the dielectric layer 11 is made of PET, it has a thickness of 250 μm and a dielectric constant of 3.34.

Figure 3:
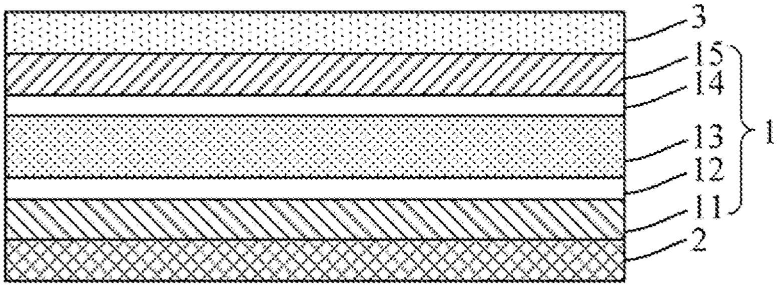
FIG. 3 is a cross-sectional view of another antenna in an embodiment of the present disclosure.

FIG. 3 is a cross-sectional view of another antenna in an embodiment of the present disclosure. In some examples, as shown in FIG. 3, a dielectric layer 1 in the antenna is a composite film layer, which includes a first dielectric sub-layer 11, a first adhesive layer 12, a second dielectric sub-layer 13, a second adhesive layer 14, and a third dielectric sub-layer 15, which are sequentially stacked. The first electrode 2 is arranged on a side of the first dielectric sub-layer 11 away from the first adhesive layer 12. The radiation structure 3 is arranged on a side of the third dielectric sub-layer 15 away from the second adhesive layer 14. In some examples, the first dielectric sub-layer 11 and the third dielectric sub-layer 15 include, but are not limited to, PI; the second dielectric sub-layer 13 includes, but is not limited to, PET. The materials of the first adhesive layer 12 and the second adhesive layer 14 may be Optically Clear Adhesive (OCA).

Figure 4:
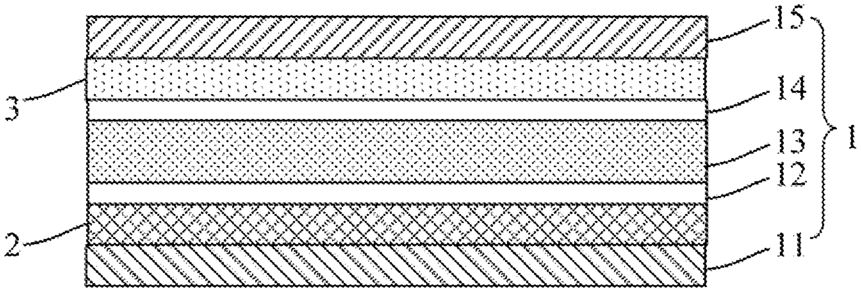
FIG. 4 is a cross-sectional view of another antenna in an embodiment of the present disclosure.

FIG. 4 is a cross-sectional view of another antenna in an embodiment of the present disclosure. In some examples, as shown in FIG. 4, the dielectric layer 1 in the antenna has a same structure as the dielectric layer 1 of the antenna shown in FIG. 3, and includes a first dielectric sub-layer 11, a first adhesive layer 12, a second dielectric sub-layer 13, a second adhesive layer 14, and a third dielectric sub-layer 15, which are sequentially stacked. The first electrode 2 is arranged on a side of the first dielectric sub-layer 11 close to the first adhesive layer 12. The radiation structure 3 is arranged on a side of the second dielectric sub-layer 13 close to the second adhesive layer 14. In some examples, the first dielectric sub-layer 11 and the third dielectric sub-layer 15 include, but are not limited to, PI; the second dielectric sub-layer 13 includes, but is not limited to, PET. The materials of the first adhesive layer 12 and the second adhesive layer 14 may be optically clear adhesive.

Figure 5:
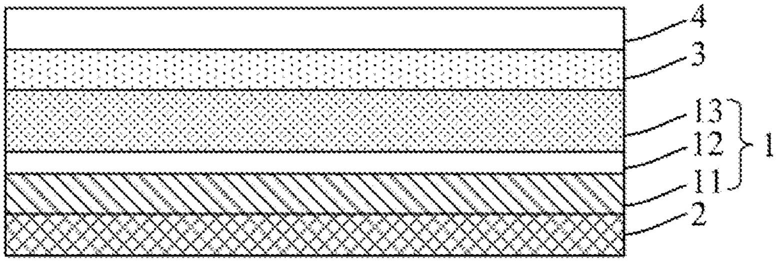
FIG. 5 is a cross-sectional view of another antenna in an embodiment of the present disclosure.

FIG. 5 is a cross-sectional view of another antenna in an embodiment of the present disclosure. In some examples, as shown in FIG. 5, the dielectric layer 1 in the antenna includes a first dielectric sub-layer 11, a first adhesive layer 12, and a second dielectric sub-layer 13, which are stacked together, that is, the first electrode 2 is arranged on a side of the first dielectric sub-layer 11 away from the first adhesive layer 12. The radiation structure 3 is arranged on a side of the second dielectric sub-layer 13 away from the first adhesive layer 12. A material of the first dielectric sub-layer 11 includes PI, and a material of the second dielectric sub-layer 13 includes PET. Alternatively, the material of the first dielectric sub-layer 11 includes PET, and the material of the second dielectric sub-layer 13 includes PI. A material of the first adhesive layer 12 may be optically clear adhesive.

In some examples, both the radiation structure 3 and the first electrode 2 each may be of a metal mesh structure. Since both the radiation structure 3 and the first electrode 2 in the embodiment of the present disclosure each adopt a metal mesh structure, the antenna may operate. In some examples, the hollow-out portions of the radiation structure 3 and the first electrode 2 are arranged in a one-to-one correspondence, and orthographic projections of the hollow-out portions arranged in a one-to-one correspondence on the dielectric layer 1 at least partially overlap with each other, such that a light transmittance of the antenna can be effectively improved. A material of the metal mesh structure includes, but is not limited to, at least one of copper (Cu), aluminum (Al), molybdenum (Mo), and silver (Ag). In some examples, the hollowed-out portion of the metal mesh structure may be triangular, diamond, square, or the like. A shape of the hollow-out portion of the metal mesh structure is not limited in the embodiments of the present disclosure. In the embodiments of the present disclosure, only a triangle is taken as an example of the hollowed-out portion of the metal mesh structure for illustration, but this does not limit the scope of the embodiments of the present disclosure. For example, where the hollow-out portion of the metal mesh structure has a shape of a triangle, a ratio of a width of the triangle to a side length thereof is not less than 0.03, For example, the side length of the triangle is 0.2 mm and a line width is 10 μm, i.e. the ratio of the width of the triangle to the side length thereof is 0.05. In some examples, an edge of the metal mesh structure may be open, i.e. metal wires constituting the metal mesh structure are not connected to each other at the edge. Alternatively, the edge of the metal mesh structure may be closed, that is, the metal wires constituting the metal mesh structure are shorted with each other at the edge.

In some examples, a shape of the first opening 21 in the first electrode 2 may be any one of a rectangle, a triangle, a circle or an ellipse, and alternatively may be other shapes. A shape of an outline of the radiation structure 3 may be the same as or different from the shape of the first opening 21. In an embodiment of the present disclosure, the outline of the radiation structure 3 and the first opening 21 have a same shape as an example. In FIG. 1, the outline of the radiation structure 3 and the first opening 21 are both rectangular as an example, and in the following description, the outline of the radiation structure 3 and the first opening 21 are both rectangular as an example for description.

With continued reference to FIG. 1, in some examples, the antenna includes not only the above-described structure but also a first feeding structure 51 and a second feeding structure 52 arranged on the side of the dielectric layer 1 away from the first electrode 2. The first feeding structure 51 is configured to provide a first microwave signal to the first feeding line 41, and the second feeding structure 52 is configured to provide a second microwave signal to the second feeding line 42. The first feeding structure 51 is electrically connected to each first feeding line 41, and the second feeding structure 52 is electrically connected to each second feeding line 42. For example, the first feeding structure 51 and the first feeding line 41 are arranged in a same layer, and are electrically connected directly to each other. The second feeding structure 52 and the second feeding line 42 are arranged in a same layer, and are electrically connected directly to each other. Alternatively, the first feeding structure 51 and the first feeding line 41 may be arranged in different layers, and in this case, the first feeding structure 51 and the first feeding line 41 may be electrically connected to each other in a coupling manner. Similarly, the second feeding structure 52 and the second feeding line 42 may be arranged in different layers, and in this case, the second feeding structure 52 and the second feeding line 42 may be electrically connected to each other in a coupling manner.

Further, with continued reference to FIG. 1, in some examples, taking a straight line in a length direction of the antenna and passing through a center of the first opening 21 as a symmetry axis, the first feeding structure 51 and the second feeding structure 52 are symmetrical to each other. In this way, an overall structure of the antenna is made uniform, thereby avoiding performance differences between the first feeding structure 51 and the second feeding structure 52.

Further, with continued reference to FIG. 1, in some examples, the number of the first openings 21 is $2^n$, correspondingly, the number of the radiation structures 3 is $2^n$, and the numbers of the first feeding lines 41 and the second feeding lines 42 are both $2^n$. In this case, the first feeding structure 51 includes n stages of third feeding lines 511, and the second feeding structure 52 includes n stages of fourth feeding lines 521; wherein at least one of the third feeding line 511 and the fourth feeding line 521 is a microstrip line. In the embodiment of the present disclosure, the third feeding line 511 and the fourth feeding line 521 each are a microstrip line as an example for description. One third feeding line 511 at a $1^{st}$ stage is connected to two adjacent first feeding lines 41, and the first feeding lines 41 connected to different third feeding lines 511 at the $1^{st}$ stage are different; one third feeding line 511 at an $m^{th}$ stage is connected to two adjacent third feeding lines 511 at an $(m-1)^{th}$ stage, and the third feeding lines 511 at the $(m-1)^{th}$ stage connected to different third feeding lines 511 at the $m^{th}$ stage are different. One fourth feeding line 521 at a $1^{st}$ stage is connected to two adjacent second feeding lines 42, and the second feeding lines 42 connected to different fourth feeding lines 521 at the $1^{st}$ stage are different; one fourth feeding line 521 at an $m^{th}$ stage is connected to two adjacent fourth feeding lines 521 at an $(m-1)^{th}$ stage, and the fourth feeding lines 521 at the $(m-1)^{th}$ stage connected to different fourth feeding lines 521 at the $m^{th}$ stage are different; wherein n is greater than or equal to 2, m is greater than or equal to 2 and less than or equal to n, and both m and n are integers.

For example, as shown in FIG. 1, the number of the first openings 21 is four, that is, n=2 as an example. The first feeding structure 51 includes two stages and three third feeding lines 511, and the second feeding structure 52 includes two stages and three fourth feeding lines 521. One third feeding line 511 at the $1^{st}$ stage is connected to feeding ports of the $1^{st}$ and $2^{nd}$ first feeding lines 41 in a top-to-bottom direction, and the other third feeding line 511 at the $1^{st}$ stage is connected to the feeding ports of the $3^{rd}$ and $4^{th}$ first feeding lines 41 in the top-to-bottom direction; the third feeding line 511 at the $2^{nd}$ stage is connected to feeding ports of the two third feeding lines 511 at the $1^{st}$ stage. Similarly, one fourth feeding line 521 at the $1^{st}$ stage is connected to the feeding ports of the $1^{st}$ and $2^{nd}$ second feeding lines 42 in the top-to-bottom direction, and the other fourth feeding line 521 at the $1^{st}$ stage is connected to the feeding ports of the $3^{rd}$ and $4^{th}$ second feeding lines 42 in the top-to-bottom direction; the fourth feeding line 521 at the $2^{nd}$ stage is connected to feeding ports of the two fourth feeding lines 521 at the $1^{st}$ stage.

In some examples, widths of the first feeding line 41 and the second feeding line 42 are equal or substantially equal to each other; widths of the third feeding line 511 and the fourth feeding line 521 are equal or substantially equal to each other. It should be noted that, the term "approximately equal" in the embodiment of the present disclosure means that a difference between the two is within a preset range. For example, the difference between the widths of the first feeding line 41 and the second feeding line 42 is no more than 0.1 mm, the widths of the first feeding line 41 and the second feeding line 42 are considered to be substantially equal to each other. Further, a ratio of the width of the first feeding line 41 (or the second feeding line 42) to the width of the third feeding line 511 (or the fourth feeding line 521) is in a range of 0.2 to 0.5. For example, the width of the first feeding line 41 and the second feeding line 42 is about 0.6 mm; the width of the third feeding line 511 and the fourth feeding line 521 is 1.5 mm; the ratio of the width of the first feeding line 41 to the width of the third feeding line 511 is 0.6:1.5=0.4. However, the line widths and the ratio of the line widths of the first feeding line 41, the second feeding line 42, the third feeding line 511 and the fourth feeding line 521 do not limit the protection scope of the embodiments of the present disclosure. Usually, the first feeding line 41, the second feeding line 42, the third feeding line 511 and the fourth feeding line 521 are arranged in a same layer and made of a same material, and in this case, the ratio of the width of first feeding line 41 to the width of the third feeding line 511 is reasonably set to realize impedance matching.

In some examples, the first feeding line 41, the second feeding line 42, the third feeding line 511 and the fourth feeding line 521 each may employ a metal mesh structure. Where the first feeding line 41, the second feeding line 42, the third feeding line 511, the fourth feeding line 521, the first electrode 2 and the radiation structure 3 each adopt a metal mesh structure, projections of the hollow-out portions of the metal mesh structures in the respective layers on the dielectric layer 1 completely overlap each other or substantially overlap each other. It should be noted that, the term "substantially overlap" in the embodiment of the present disclosure means that a width of an offset area between the orthographic projections of the hollow-out portions of two layers of metal mesh is not greater than one time of the line width. Through such a setting, optical transmittance of the antenna can be effectively improved.

Figure 6:
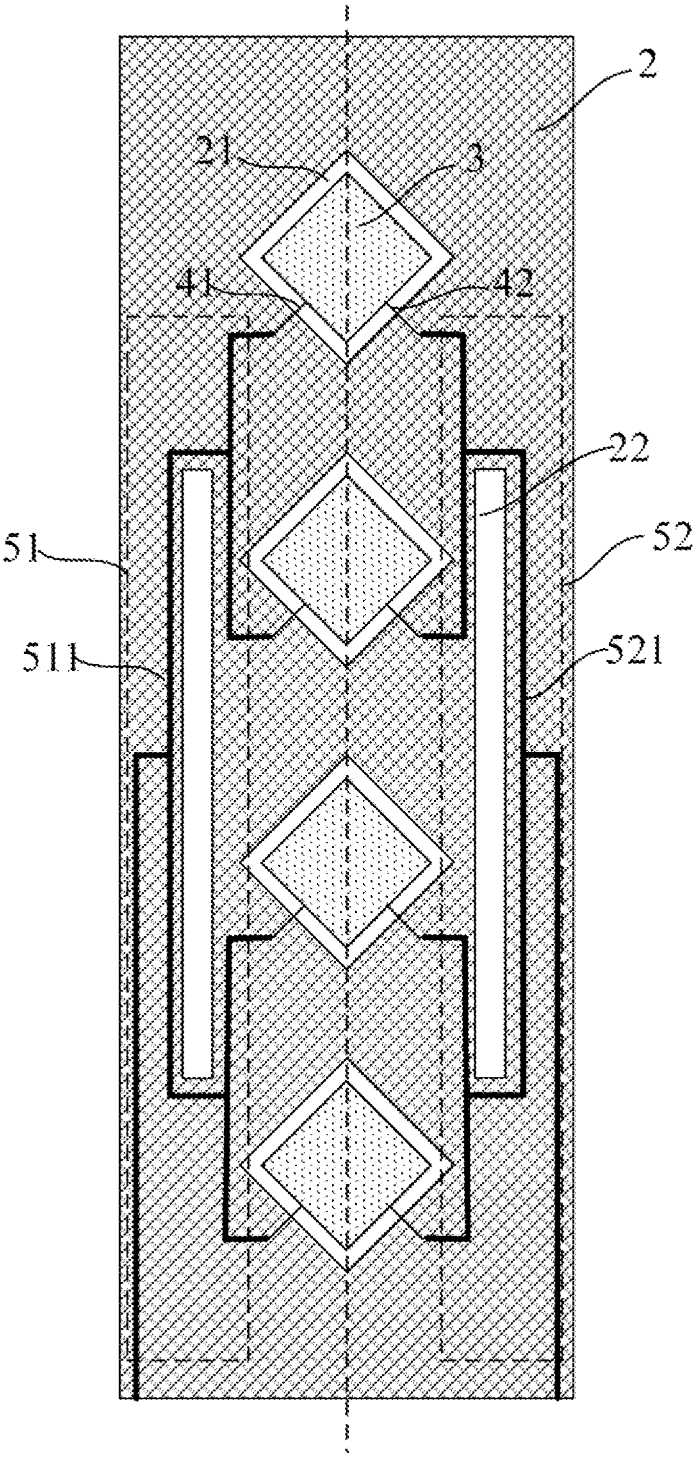
FIG. 6 is a top view of another antenna in an embodiment of the present disclosure.

FIG. 6 is a top view of another antenna in an embodiment of the present disclosure. In some examples, as shown in FIG. 6, the antenna has a radiation region where the radiation structure 3 is arranged and a feeding region where the first feeding structure 51 and the second feeding structure 52 are arranged. A structure of this antenna is substantially the same as that of the antenna shown in FIG. 1, and the only difference lies in the structure of the first electrode 2. The first electrode 2 includes not only the first opening 21 located in the radiation region but also a second opening 22 located in the feeding region, and an orthographic projection the second opening 22 on the dielectric layer 1 does not overlap orthographic projections of the first feeding structure 51 and the second feeding structure 52 on the dielectric layer 1. Through providing the second opening 22, not only the optical transmittance of the antenna may be improved, but also a radiation direction of the microwave signal may be changed.

Figure 7:
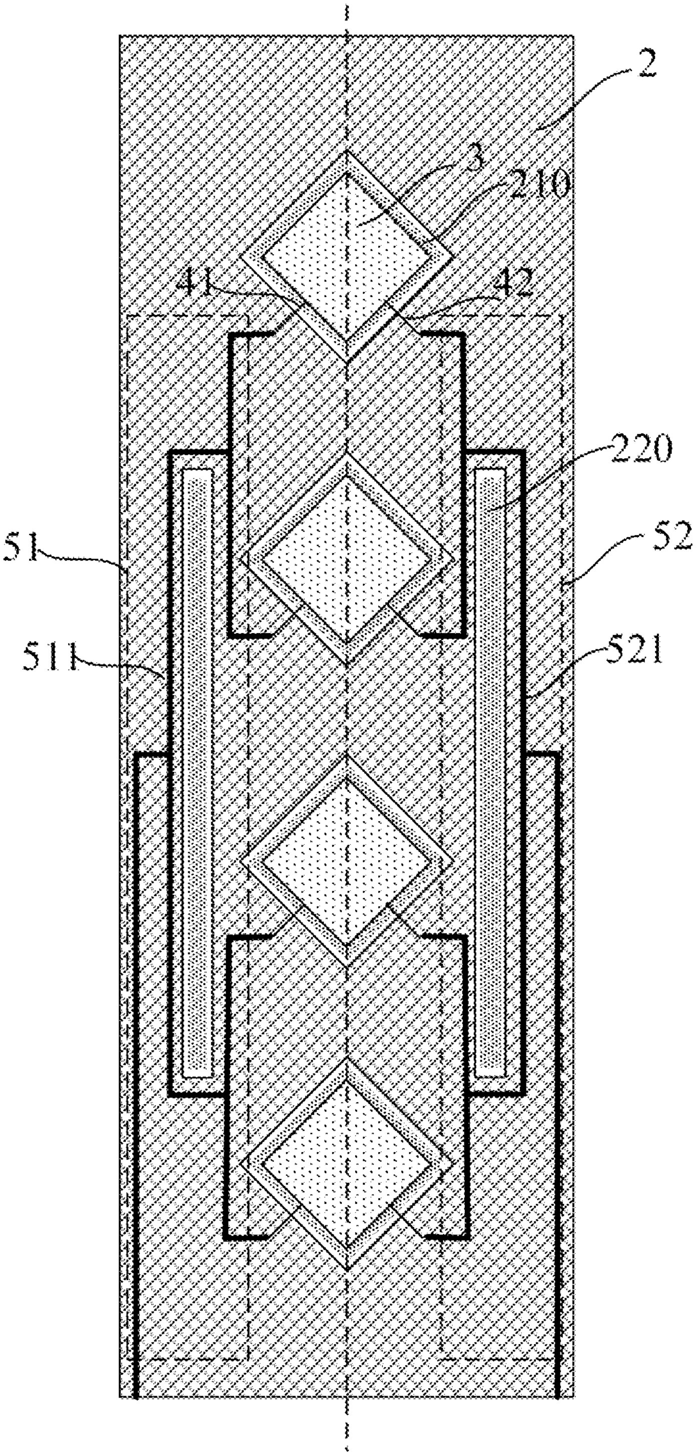
FIG. 7 is a top view of another antenna in an embodiment of the present disclosure.

FIG. 7 is a top view of another antenna in an embodiment of the present disclosure. In some examples, as shown in FIG. 7, the antenna has substantially the same structure as that shown in FIG. 6, except that a first redundant electrode 210 is filled in the first opening 21 of the first electrode 2, and a second redundant electrode 220 is filled in the second opening 22. In some examples, the first redundant electrode 210 and the second redundant electrode 220 are both arranged in a same layer and are made of a same material as the first electrode 2. That is, the first redundant electrode 210, the second redundant electrode 220 and the first electrode 2 may be manufactured through a same patterning process. It should be noted that the first redundant electrode 210 and the second redundant electrode 220 each may also adopt a metal mesh structure, but the metal wires of the metal mesh structure constituting the first redundant electrode 210 and the second redundant electrode 220 are broken.

Figure 8:
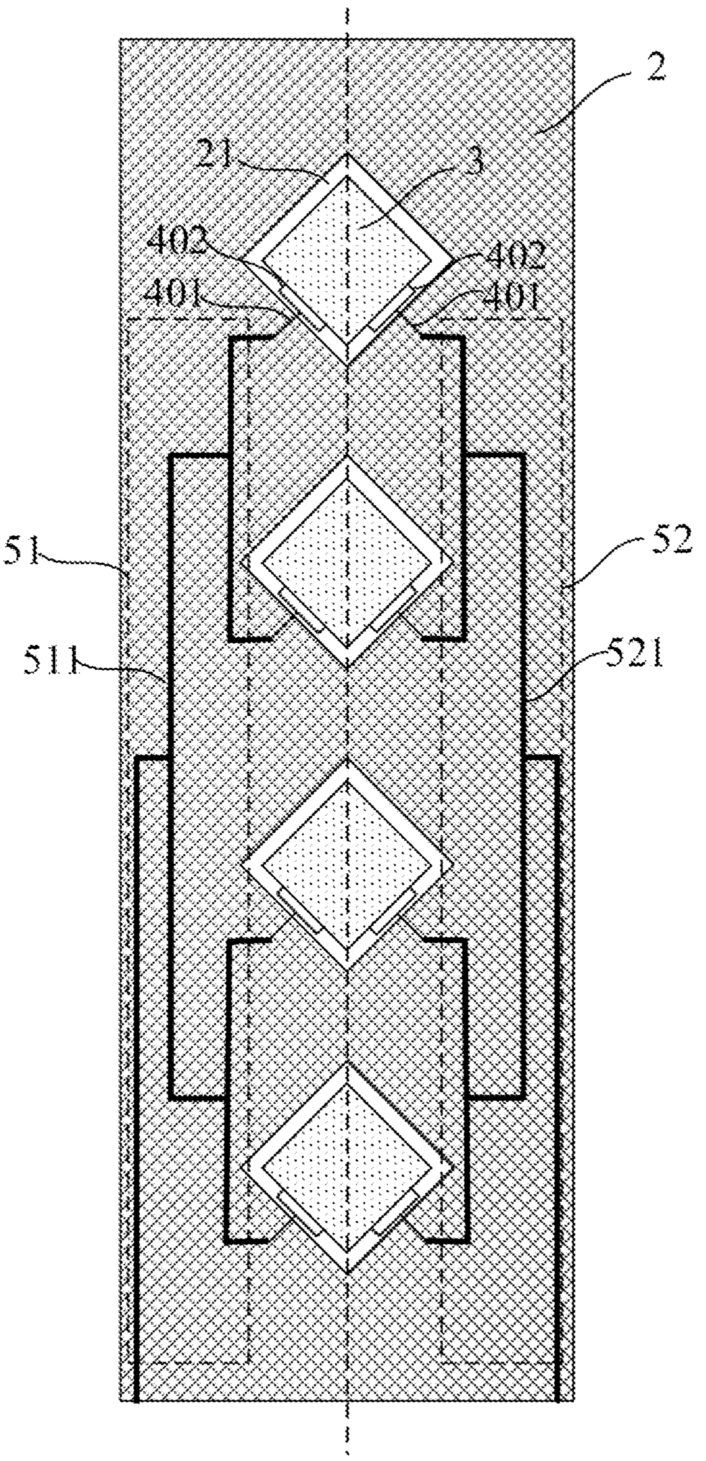
FIG. 8 is a top view of another antenna in an embodiment of the present disclosure.

FIG. 8 is a top view of another antenna in an embodiment of the present disclosure. In some examples, as shown in FIG. 8, a structure of this antenna is substantially the same as that of the antenna illustrated in FIG. 1, except that the first feeding line 41 and the second feeding line 42 in this antenna are different from the first feeding line 41 and the second feeding line 42 in FIG. 1. For any one first feeding line 41 and any one second feeding line, the first feeding line 41 and the second feeding line 42 each include a connecting portion 401 and two branch portions 402. One end of each of the two branch portions 402 of the first feeding line 41 is connected to the connecting portion 401 of the first feeding line 41, and the other end thereof is connected to the radiation structure 3. Similarly, one end of each of the two branch portions 402 of the second feeding line 42 is connected to the connecting portion 401 of the second feeding line 42, and the other end thereof is connected to the radiation structure 3. That is, each of the first feeding line 41 and the second feeding line 42 has two connection nodes with one radiation structure 3, in this case, the first microwave signal provided by the first feeding structure 51 may be fed to the radiation structure 3 through two feeding points, and the second microwave signal provided by the second feeding structure 52 may be fed to the radiation structure 3 through two feeding points, so that the transmission uniformity of the microwave signal can be effectively improved.

With continued reference to FIG. 8, in some examples, orthographic projections of the branch portions 402 of the first feeding line 41 and the second feeding line 42 on the dielectric layer 1 is within the orthographic projection of the first opening 21 on the dielectric layer 1, through such an arrangement, the radiation direction of the microwave signal may be adjusted.

It should be noted that, in FIG. 8, it is only taken as an example that the first feeding line 41 and the second feeding line 42 each include one connecting portion 401 and two branch portions 402. In an actual product, the first feeding line 41 and the second feeding line 42 may alternatively each include a plurality of branch portions 402, which are not listed here. In the following description, it is also taken as an example that the first feeding line 41 and the second feeding line 42 each include one connecting portion 401 and two branch portions 402.

Figure 9:
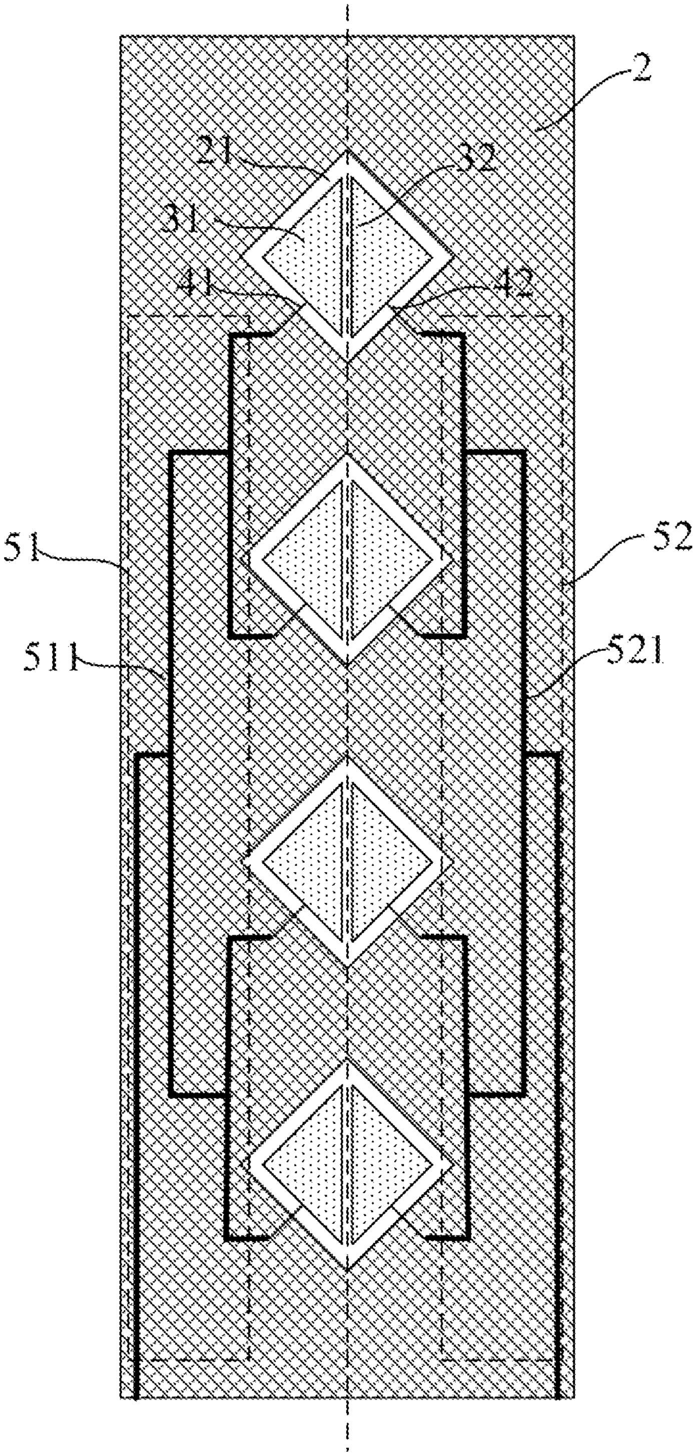
FIG. 9 is a top view of another antenna in an embodiment of the present disclosure.

FIG. 9 is a top view of another antenna in an embodiment of the present disclosure. In some examples, as shown in FIG. 9, a structure of this antenna is substantially the same as that of the antenna shown in FIG. 1, except that the radiation structure 3 of this antenna includes a first radiating element 31 and a second radiating element 32 which are spaced apart from each other. Taking a straight line which is in a length direction of the antenna and passes through the center of the first opening 21 as a symmetry axis, the first radiating element 31 and the second radiating element 32 in one radiation structure 3 are symmetrical to each other. Each first feeding line 41 is connected to one first radiating element 31, and each second feeding line 42 is connected to one second radiating element 32. As shown in FIG. 9, the radiation structure 3 is equivalent to the radiation structure 3 in FIG. 8 being divided into two parts, that is, the first radiating element 31 and the second radiating element 32 adopt a triangular patch structure. In the antenna shown in FIG. 9, each radiation structure 3 includes a first radiating element 31 and a second radiating element 32 spaced apart from each other, and the first radiating element 31 is fed by a first feeding line 41, and the second radiating element 32 is fed by a second feeding line 42, in such a way, the feeding lines of the two polarization directions may be prevented from interacting with each other. Other structures in FIG. 9 are the same as that of the antenna shown in FIG. 1, and therefore, the description thereof is omitted here.

Figure 10:
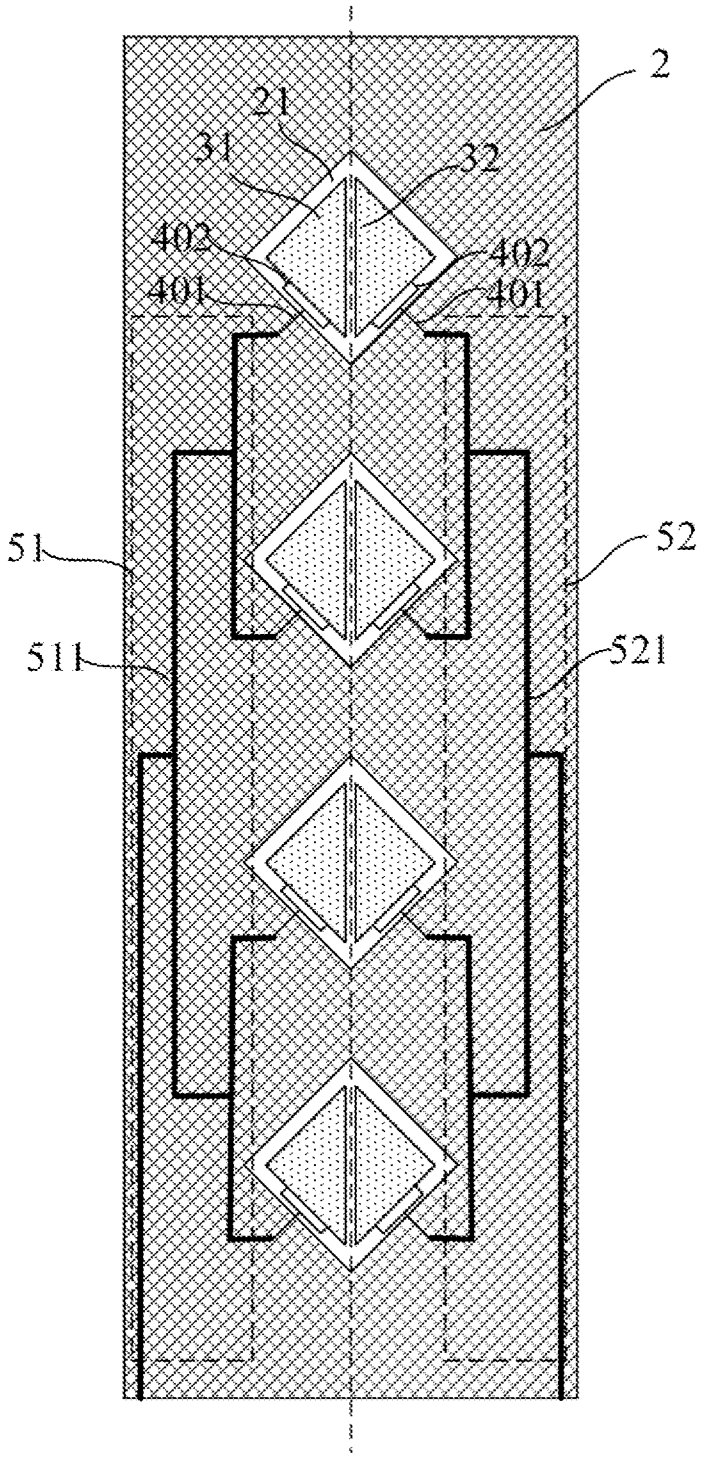
FIG. 10 is a top view of another antenna in an embodiment of the present disclosure.

FIG. 10 is a top view of another antenna in an embodiment of the present disclosure. In some examples, as shown in FIG. 10, the structure of this antenna is substantially the same as that of the antenna shown in FIG. 9, except that in the antenna shown in FIG. 10, the first feeding line 41 and the second feeding line 42 adopt the structure shown in FIG. 8. That is, for any one first feeding line 41 and any one second feeding line, the first feeding line 41 and the second feeding line 42 each include a connecting portion 401 and two branch portions 402. One end of each of the two branch portions 402 of the first feeding line 41 is connected to the connecting portion 401 of the first feeding line 41, and the other end thereof is connected to the first radiating element 31. Similarly, one end of each of the two branch portions 402 of the second feeding line 42 is connected to the connecting portion 401 of the second feeding line 42, and the other end thereof is connected to the second radiating element 32. That is to say, in the antenna shown in FIG. 10, not only the mutual influence between the feeding lines in the polarization directions can be avoided, but also the performance of the antenna can be optimized by using a plurality of feeding points for feeding.

Figure 11:
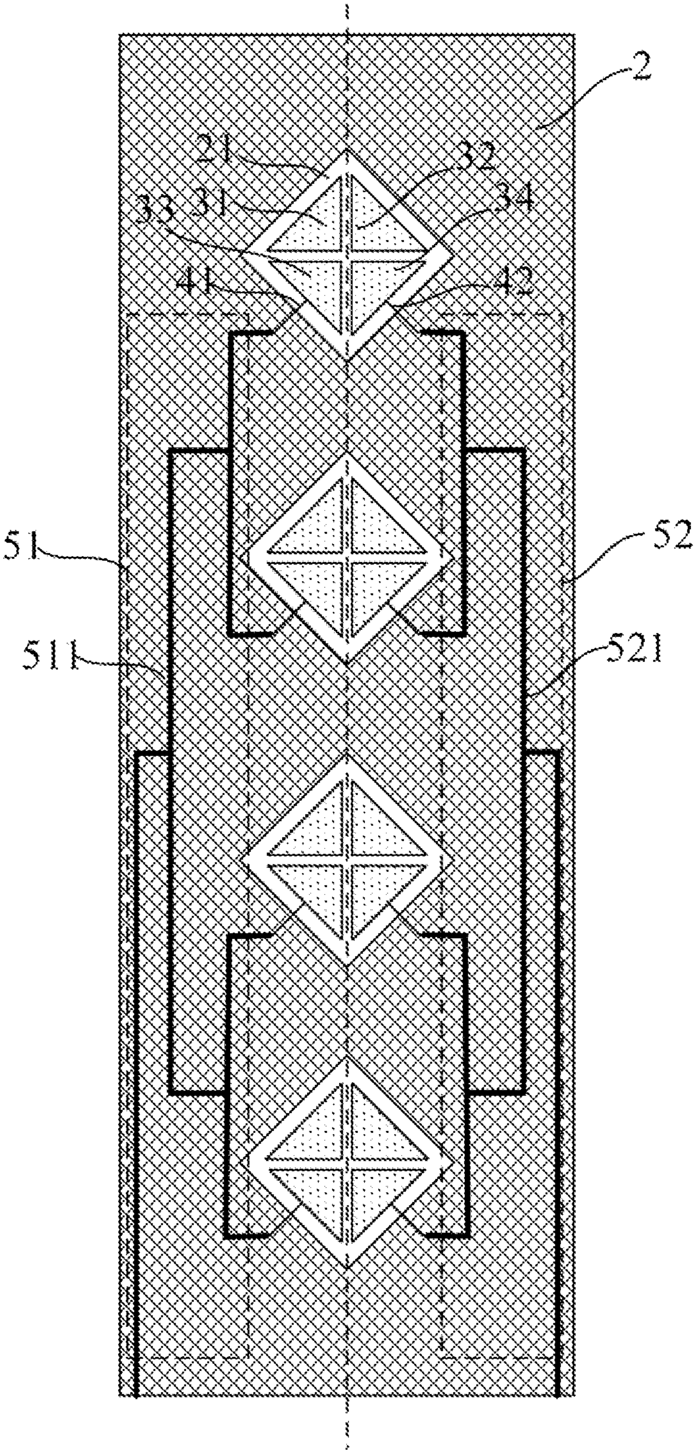
FIG. 11 is a top view of another antenna in an embodiment of the present disclosure.

FIG. 11 is a top view of another antenna in an embodiment of the present disclosure. In some examples, as shown in FIG. 11, the structure of this antenna is substantially the same as that of the antenna shown in FIG. 9, except that the radiation structure 3 in this antenna includes a first radiating element 31, a second radiating element 32, a third radiating element 33, and a fourth radiating element 34. Taking a straight line which is in a length direction of the antenna and passes through the center of the first opening 21 as a symmetry axis, the first radiating element 31 and the second radiating element 32 in one radiation structure 3 are symmetrical to each other, and the third radiating element 33 and the fourth radiating element 34 are symmetrical to each other. Taking a straight line which is in a width direction of the antenna and passes through the center of the first opening 21 as a symmetry axis, in one radiation structure 3, the first radiating element 31 and the third radiating element 33 are symmetrical to each other, and the second radiating element 32 and the fourth radiating element 34 are symmetrical to each other. Each first feeding line 41 is connected to one first radiating element 31, and each second feeding line 42 is connected to one second radiating element 32. Alternatively, each first feeding line 41 is connected to one third radiating element 33, and each second feeding line 42 is connected to one fourth radiating element 34. In FIG. 11, in one radiation structure 3, the third radiating element 33 is connected to the first feeding line 41, and the fourth radiating element 34 is connected to the second feeding line 42. With continued reference to FIG. 11, the first radiating element 31, the second radiating element 32, the third radiating element 33 and the fourth radiating element 34 in each radiation structure 3 define a cross-shaped slit. Through providing the cross-shaped slit, isolation between the microwave signals in two polarization directions fed respectively by the first feeding line 41 and the second feeding line 42 can be effectively improved. The first radiating element 31, the second radiating element 32, the third radiating element 33 and the fourth radiating element 34 each are of a triangular patch structure. Alternatively, the first radiating element 31, the second radiating element 32, the third radiating element 33 and the fourth radiating element 34 are not limited to the triangular patch structure, and radiating elements of different shapes can be selected according to specific performance parameters of a product.

Figure 12:
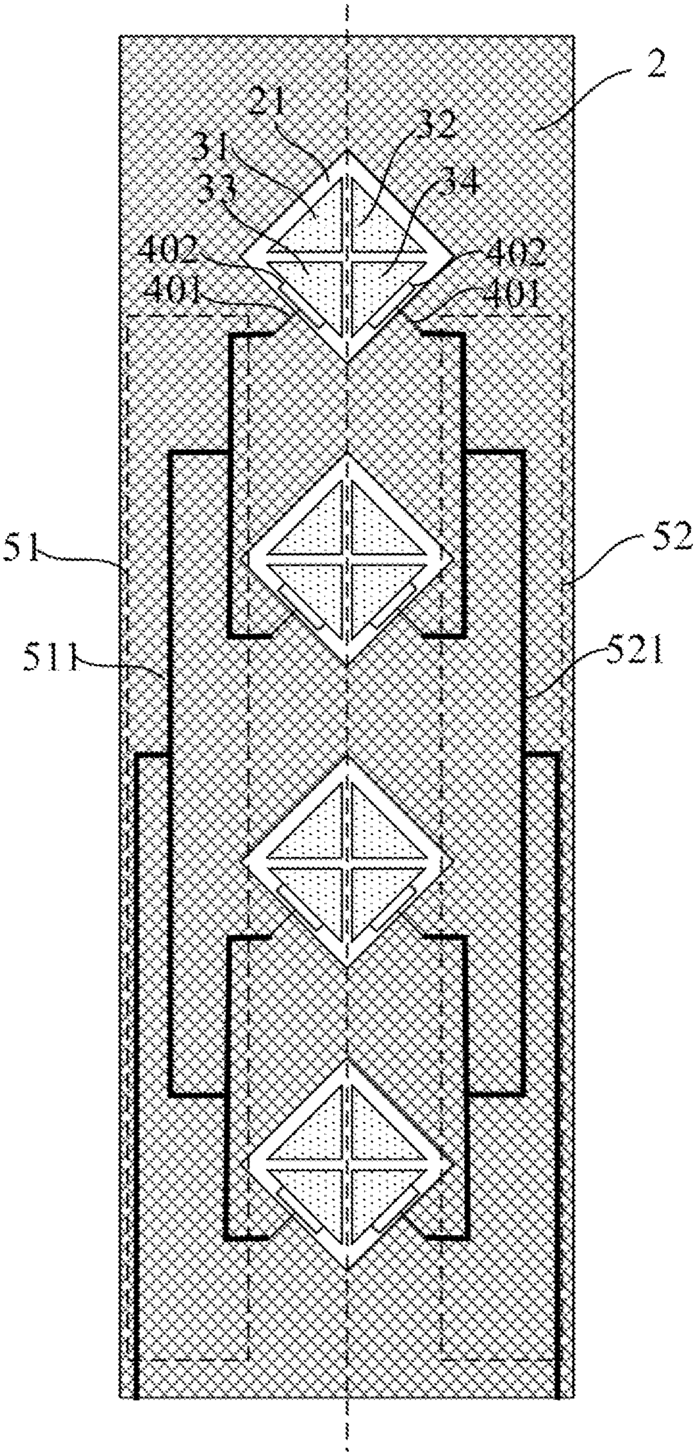
FIG. 12 is a top view of another antenna in an embodiment of the present disclosure.

FIG. 12 is a top view of another antenna in an embodiment of the present disclosure. In some examples, as shown in FIG. 12, the structure of this antenna is substantially the same as that of the antenna shown in FIG. 11, except that the first feeding line 41 and the second feeding line 42 of this antenna adopt the structure shown in FIG. 8. That is, for any one first feeding line 41 and any one second feeding line, the first feeding line 41 and the second feeding line 42 each include a connecting portion 401 and two branch portions 402. One end of each of the two branch portions 402 of the first feeding line 41 is connected to the connecting portion 401 of the first feeding line 41, and the other end thereof is connected to the first radiating element 31. Similarly, one end of each of the two branch portions 402 of the second feeding line 42 is connected to the connecting portion 401 of the second feeding line 42, and the other end thereof is connected to the second radiating element 32. That is to say, in the antenna shown in FIG. 12, not only the mutual influence between the feeding lines in the polarization directions can be avoided, but also the performance of the antenna can be optimized by using a plurality of feeding points for feeding.

Figure 13:
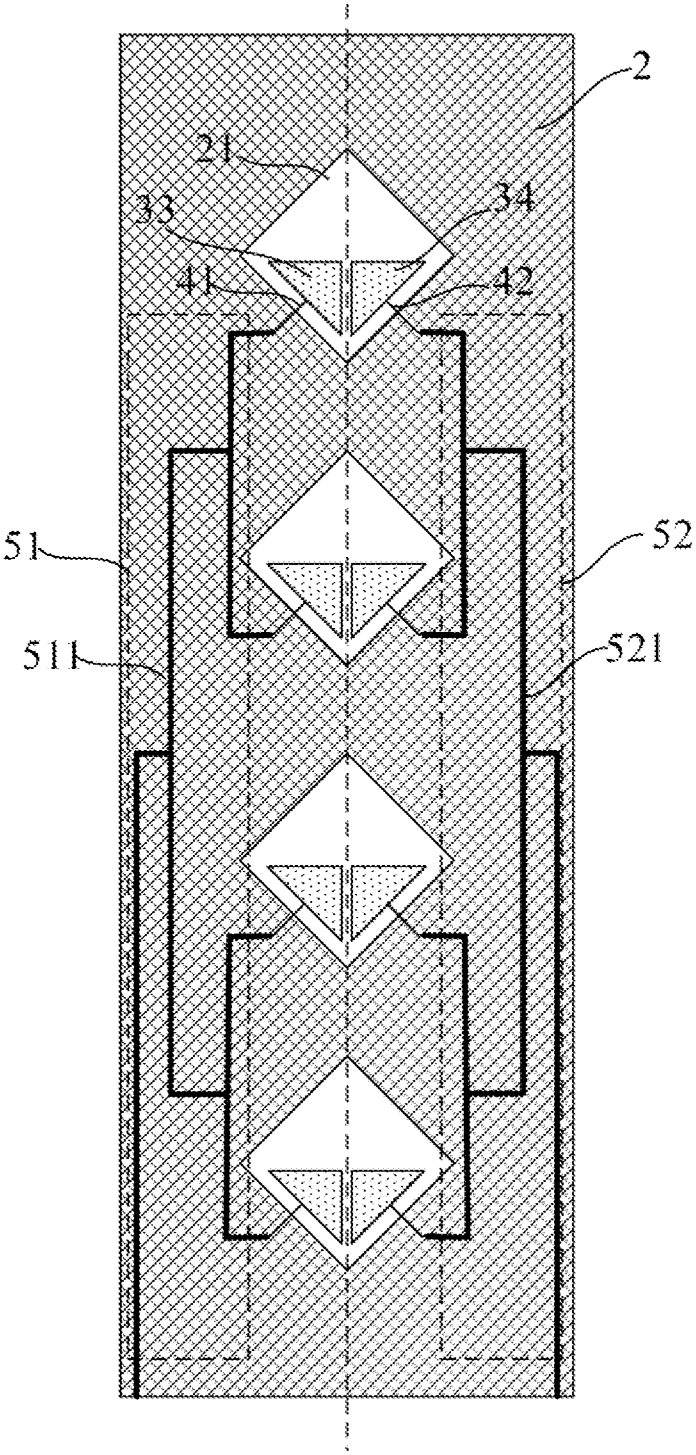
FIG. 13 is a top view of another antenna in an embodiment of the present disclosure.

FIG. 13 is a top view of another antenna in an embodiment of the present disclosure. In some examples, as shown in FIG. 13, the structure of this antenna is substantially the same as that of the antenna shown in FIG. 11, except that the structure of this antenna includes only the third radiating element 33 and the fourth radiating element 34 in FIG. 11. Other structure is the same as that of the antenna shown in FIG. 11, and therefore, the description thereof is not repeated here. In this antenna, the isolation between microwave signals in two polarization directions fed respectively by the first feeding line 41 and the second feeding line 42 can also be improved.

Figure 14:
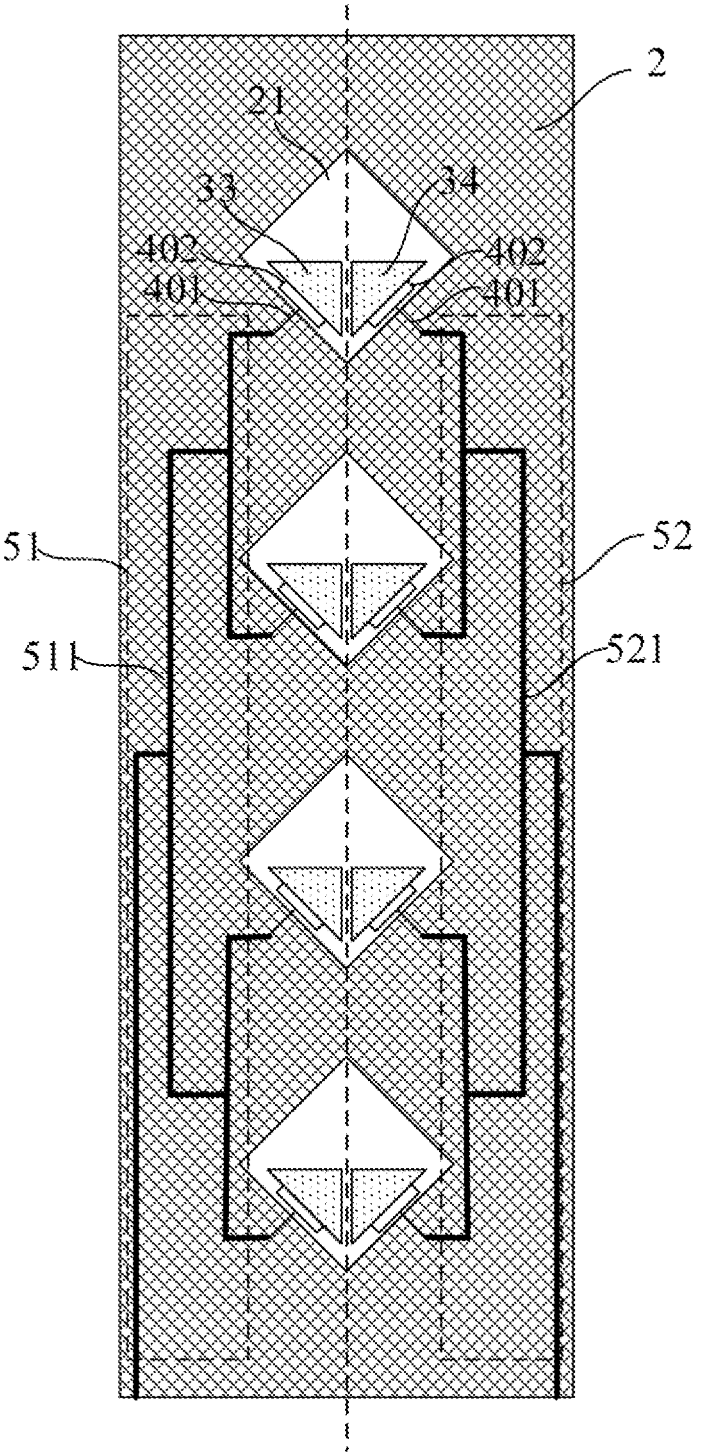
FIG. 14 is a top view of another antenna in an embodiment of the present disclosure.

FIG. 14 is a top view of another antenna in an embodiment of the present disclosure. In some examples, as shown in FIG. 14, the structure of this antenna is substantially the same as that of the antenna shown in FIG. 12, except that the structure of this antenna only includes the third radiating element 33 and the fourth radiating element 34 in FIG. 12, other structures are the same as that of the antenna shown in FIG. 12, and therefore, the description thereof is not repeated here. In this antenna, the isolation between microwave signals in two polarization directions fed respectively by the first feeding line 41 and the second feeding line 42 can also be improved, and the performance of the antenna can be optimized by adopting a plurality of feeding points for feeding.

In order to make the structure and performance of the antennas in the embodiments of the present disclosure clearer, the antennas in the embodiments of the present disclosure are described with reference to specific examples and simulation results. It should be noted that, in the following, it is only taken as an example that the first electrode 2 of the antenna includes only four first openings 21, the number of corresponding radiating elements is also four, and the polarization directions of the antenna is ±45°.

A First Example

The antenna has a cross-section view as shown in FIG. 2 and a plan view as shown in FIG. 12. The dielectric layer 1 adopts a PET substrate with a thickness of 250 μm, and Dk/Df thereof is 3.34/0.0069. The first electrode 2 adopts metal copper Cu with a thickness of 2.0 μm, and a first opening 21 in the first electrode 2 is square. The radiation structure 3 is made of metal copper Cu with a thickness of 2.0 μm, the radiation structure 3 includes a first radiating element 31, a second radiating element 32, a third radiating element 33 and a fourth radiating element 34, which are located in a same layer. The first feeding line 41 is connected to the third radiating element 33, and the second feeding line 42 is connected to the fourth radiating element 34. In this case, the two polarizations are made into a same layer, so that the number of layers of the dielectric substrate can be reduced, and the cross-section of the antenna can be reduced. The first radiating element 31, the second radiating element 32, the third radiating element 33 and the fourth radiating element 34 in each radiation structure 3 form a cross-shaped slit, and the first radiating element 31, the second radiating element 32, the third radiating element 33 and the fourth radiating element 34 are four identical triangular patches, for improving isolation. The third radiating element 33 and the fourth radiating element 34 are used as main radiating patches, the first radiating element 31 and the second radiating element 32 are used as parasitic patches, the first feeding line 41 is connected to the third radiating element 33 through the two branch portions 402, and the second feeding line 42 is connected to the fourth radiating element 34 through the two branch portions, which is beneficial to uniform distribution of current in the radiation structure 3, and thus, antenna gain is improved. As shown in FIG. 12, an overall size of the antenna is 77.5 mm×250.7 mm, from the above structure, it is obtained that simulation values of −10 dB impedance bandwidth of the two ports of the antenna are both 1.27 GHz (3.23 GHz to 4.5 GHz), simulation values of −6 dB impedance bandwidth of the two ports are both 1.44 GHz (3.06 GHz to 4.5 GHz), gains of the two ports at a central frequency point (3.75 GHz) are both 9.48 dBi, half-power beam widths of the two ports are both 57°/16°, and polarization isolations of the two ports are 12.89 dB and 12.96 dB, respectively.

A Second Example

The antenna has a cross-section view as shown in FIG. 2 and a plan view as shown in FIG. 1. Compared with the first example, the radiation structure 3 in this embodiment does not have a cross-shaped slit, and is connected to only one feeding line. An overall size of the antenna is still 77.5 mm×250.7 mm, from the above structure, it is obtained by simulation that the −10 dB impedance bandwidths of two ports of the antenna are 0.63 GHz (3.64 GHz to 4.27 GHz) and 0.62 GHz (3.64 GHz to 4.26 GHz), respectively, the −6 dB impedance bandwidths of the two ports of the antenna are both 1.43 GHz (3.07 GHz to 4.5 GHz), the gains of the two ports at the central frequency point (3.75 GHz) are 7.97 dBi and 7.98 dBi, respectively, the half-power beam widths of the two ports are 59°/16° and 58°/16°, respectively, and the polarization isolations of the two ports are 5.87 dB and 5.99 dB, respectively.

A Third Example

The antenna has a cross-section view as shown in FIG. 2 and a plan view as shown in FIG. 11. Compared to the first example, the radiation structure 3 in this embodiment is provided with the cross-shaped slit, but is connected to only one feeding line. An overall size of the antenna is 76.1 mm×250.7 mm, from the above structure, it is obtained by simulation that the −10 dB impedance bandwidths of two ports of the antenna are both 1.19 GHz (3.31 GHz to 4.5 GHz), the −6 dB impedance bandwidths of the two ports of the antenna are both 1.33 GHz (3.17 GHz to 4.5 GHz), the gains of the two ports at the central frequency point (3.75 GHz) are both 9.32 dBi, the half-power beam widths of the two ports are both 58°/16°, and the polarization isolations of the two ports are 13.3 dB and 13.16 dB, respectively.

A Fourth Example

The antenna has a cross-section view as shown in FIG. 2 and a plan view as shown in FIG. 8. Compared with the first example, the radiation structure 3 in this embodiment does not have a cross-shaped slit, but is connected to two feeding lines. An overall size of the antenna is 78.2 mm×250.7 mm, from the above structure, it is obtained by simulation that the −10 dB impedance bandwidths of two ports of the antenna are both 0.89 GHz (3.61 GHz to 4.5 GHz), the −6 dB impedance bandwidths of the two ports of the antenna are both 1.5 GHz (3.0 GHz to 4.5 GHz), the gains of the two ports at the central frequency point (3.75 GHz) are 8.79 dBi and 8.81 dBi, respectively, the half-power beam widths of the two ports are both 57°/16°, and the polarization isolations of the two ports are 9.0 dB and 9.03 dB, respectively.

A Fifth Example

The antenna has a cross-section view as shown in FIG. 2 and a plan view as shown in FIG. 10. Compared to the first example, the radiation structure 3 in this embodiment is provided with only one rectangular slit, i.e. the radiation structure 3 includes only the first radiating element 31 and the second radiating element 32. An overall size of the antenna is 78.2 mm×250.7 mm, from the above structure, it is obtained by simulation that the −10 dB impedance bandwidths of two ports of the antenna are both 0.15 GHz (3.12 GHz to 3.27 GHz), the −6 dB impedance bandwidths of the two ports of the antenna are both 0.53 GHz (3.54 GHz to 4.07 GHz), the gains of the two ports at the central frequency point (3.75 GHz) are both 6.41 dBi, the half-power beam widths of the two ports are both 61°/16°, and the polarization isolations of the two ports are 9.01 dB and 9.09 dB, respectively.

A Sixth Example

The antenna has a cross-section view as shown in FIG. 2 and a plan view as shown in FIG. 14. Compared to the first example, the radiation structure 3 in this embodiment remains only the lower half part after the cross-shaped slit being formed therewith, that is, the radiation structure 3 only includes the third radiating element 33 and the fourth radiating element 34. An overall size of the antenna is 77.5 mm×250.7 mm, the −10 dB impedance bandwidths of two ports of the antenna are both 1.19 GHz (3.31 GHz to 4.5 GHz), the −6 dB impedance bandwidths of the two ports of the antenna are both 1.34 GHz (3.16 GHz to 4.5 GHz), the gains of the two ports at the central frequency point (3.75 GHz) are 8.38 dBi and 8.41 dBi, respectively, the half-power beam widths of the two ports are 57°/16° and 58°/16°, respectively, and the polarization isolations of the two ports are 7.6 dB and 7.61 dB, respectively.

Figure 15:
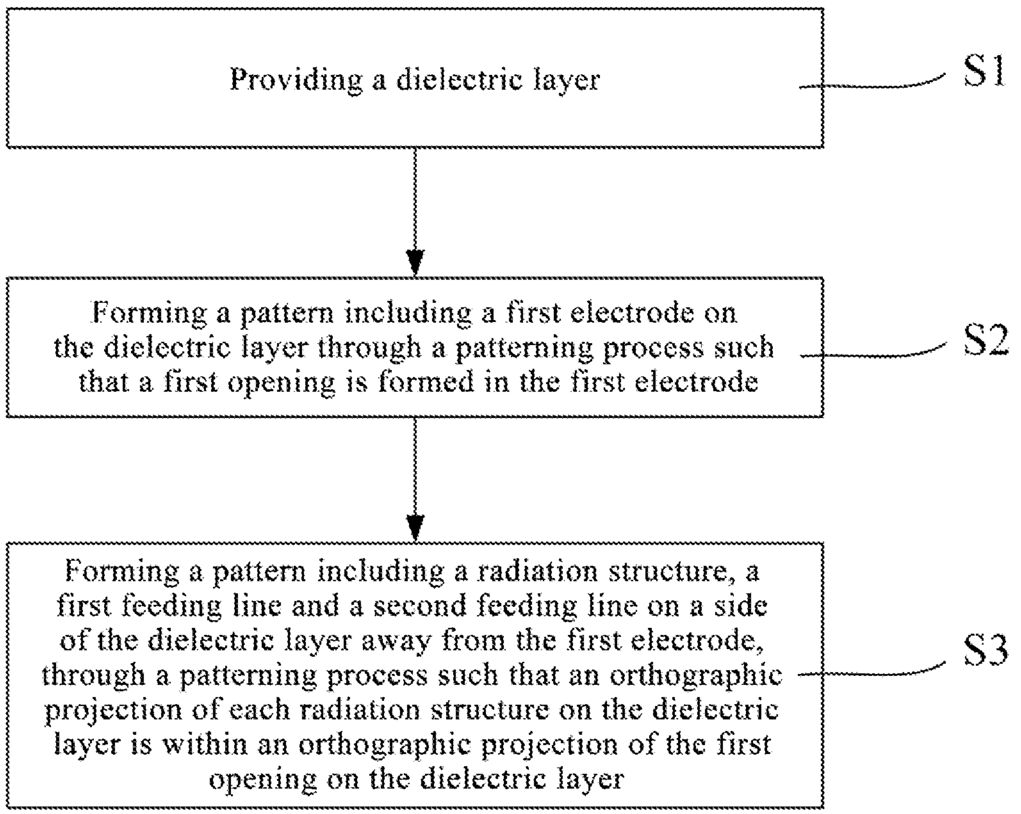
FIG. 15 is a flowchart of a method for manufacturing an antenna in an embodiment of the present disclosure.

FIG. 15 is a flow chart of a method for manufacturing an antenna in an embodiment of the present disclosure. In a second aspect, as shown in FIG. 15, the present disclosure provides a method for manufacturing an antenna, which may be used to manufacture any one of the antennas described above. The method specifically includes the following steps:

Step S1, providing a dielectric layer 1.

The dielectric layer 1 may be a flexible substrate or a glass substrate, and the step S1 may include a step of cleaning the dielectric layer 1.

Step S2, forming a pattern including a first electrode 2 on the dielectric layer 1 through a patterning process. A first opening 21 is formed in the first electrode 2.

In some examples, step S2 may specifically include: depositing a first metal film on the dielectric layer 1 through a manner including, but not limited to, magnetron sputtering, then coating photoresist, exposing and developing, then performing wet etching, and stripping the photoresist after etching to form a pattern including the first electrode 2.

Step S3, forming a pattern including a radiation structure 3, a first feeding line 41 and a second feeding line 42 on a side of the dielectric layer 1 away from the first electrode 2, through a patterning process. An orthographic projection of each radiation structure 3 on the dielectric layer 1 is within an orthographic projection of the first opening 21 on the dielectric layer 1.

Each radiation structure 3 is electrically connected to one first feeding line 41 and one second feeding line 42, respectively. Taking a straight line in the length direction of the antenna and passing through the center of the first opening 21 as a symmetry axis, the first feeding line 41 and the second feeding line 42 connected to a same radiation structure 3 are symmetrical to each other.

For example, the dielectric layer 1 includes a first dielectric sub-layer 11, a first adhesive layer 12 and a second dielectric sub-layer 13, which are sequentially laminated. The first electrode 2 is formed on a side of the first dielectric sub-layer 11 away from the first adhesive layer 12, and the radiation structure 3 is formed on a side of the second dielectric sub-layer 13 away from the first adhesive layer 12. Further, a protective layer, such as a transparent waterproof coating having a self-healing capability, may be formed on a side of the radiation structure 3 away from the second dielectric sub-layer 13. In some examples, a material of the first dielectric sub-layer 11 and the second dielectric sub-layer 13 includes, but is not limited to, polyimide (PI) or polyethylene terephthalate (PET). A material of the first adhesive layer 12 may be optical clear adhesive (OCA).

In a third aspect, an embodiment of the present disclosure provides an antenna system, which may include the antenna described above. The antenna may be fixed on a base station.

The communication system in an embodiment of the present disclosure may be used in a glass window system for an automobile, a train (including a high-speed rail train), an aircraft, a building, or the like. The antenna may be fixed to an inner side (a side close to the room) of the glass window. Since the antenna has a high optical transmittance, the antenna has little influence on the transmittance of the glass window while realizing a communication function, and the antenna will also be a trend toward an embellished antenna. The glass window in an embodiment of the present disclosure includes, but is not limited to, a double-layer glass, and a type of the glass window may alternatively be a single-layer glass, a laminated glass, a thin glass, a thick glass, or the like.

In some examples, the communication system provided in an embodiment of the present disclosure further includes a transceiving unit, a radio frequency transceiver, a signal amplifier, a power amplifier, and a filtering unit. The antenna in the communication system may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the antenna in the communication system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Further, the radio frequency transceiver is connected to the transceiving unit and is used for modulating the signals transmitted by the transceiving unit or for demodulating the signals received by the antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Further, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the antenna, and the antenna radiates the signal. In the process of receiving a signal by the communication system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the communication system provided in an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. An antenna, comprising:

a dielectric layer;

a first electrode on the dielectric layer and with at least one first opening therein;

at least one radiation structure on a side of the dielectric layer away from the first electrode; and at least one first feeding line and at least one second feeding line, which are on the side of the dielectric layer away from the first electrode, wherein an orthographic projection of a respective radiation structure of the at least one radiation structure on the dielectric layer is within an orthographic projection of a corresponding first opening of the at least one first opening on the dielectric layer; and the respective radiation structure is electrically connected to a corresponding first feeding line of the at least one first feeding line and a corresponding second feeding line of the at least one second feeding line; and taking a straight line which passes through a center of the first opening and is parallel to a plane where the first electrode is located as a symmetry axis, the corresponding first feeding line and the corresponding second feeding line, which are connected to the respective radiation structure, are symmetrical to each other, wherein the antenna further comprises a first feeding structure and a second feeding structure, each on the side of the dielectric layer away from the first electrode, wherein the first feeding structure is electrically connected to the at least one first feeding line, and the second feeding structure is electrically connected to the at least one second feeding line; and the first feeding structure is in a same layer as and is electrically connected to the at least one first feeding line; and the second feeding structure is in a same layer as and is electrically connected to the at least one second feeding line.

2. The antenna according to claim 1, wherein at least one of the first feeding line and the second feeding line is a microstrip line, and feeding directions of the first feeding line and the second feeding line differ by 90°.

3. The antenna according to claim 2, wherein orthographic projections of the corresponding first feeding line and the corresponding second feeding line on the dielectric layer each at least partially overlap an orthographic projection of the corresponding first opening on the dielectric layer; and orthographic projections of a plurality of branch portions of the corresponding first feeding line and a plurality of branch portions of the corresponding second feeding line on the dielectric layer each are within the orthographic projection of the corresponding first opening on the dielectric layer.

4. The antenna according to claim 1, wherein the first feeding line and the second feeding line each comprise a connecting portion and a plurality of branch portions connected to the connecting portion, and a plurality of branch portions of the corresponding first feeding line and a plurality of branch portions of the corresponding second feeding line each are connected to the respective radiation structure.

5. The antenna according to claim 1, wherein the radiation structure comprises a first radiating element and a second radiating element spaced apart from each other; taking a straight line which is in a length direction of the antenna and passes through the center of the first opening as a symmetry axis, the first radiating element and the second radiating element in one of the at least one radiation structure are symmetrical to each other; and each of the at least one first feeding line is connected to the first radiating element, and each of the at least one second feeding line is connected to the second radiating element.

6. The antenna according to claim 5, wherein the first radiating element and the second radiating element each are of a triangular patch structure.

7. The antenna according to claim 1, wherein the radiation structure comprises a first radiating element, a second radiating element, a third radiating element and a fourth radiating element spaced apart from each other; taking a straight line which is in a length direction of the antenna and passes through the center of the first opening as a symmetry axis, the first radiating element and the second radiating element in one of the at least one radiation structure are symmetrical to each other, and the third radiating element and the fourth radiating element in one of the at least one radiation structure are symmetrical to each other; taking a straight line which is in a width direction of the antenna and passes through the center of the first opening as a symmetry axis, the first radiating element and the third radiating element in one of the at least one radiation structure are symmetrical to each other, and the second radiating element and the fourth radiating element in one of the at least one radiation structure are symmetrical to each other;

each of the at least one first feeding line is connected to the first radiating element, and each of the at least one second feeding line is connected to the second radiating element; or, each of the at least one first feeding line is connected to the third radiating element, and each of the at least one second feeding line is connected to the fourth radiating element.

8. The antenna according to claim 7, wherein the first radiating element, the second radiating element, the third radiating element, and the fourth radiating element are each of a triangular patch structure.

9. The antenna according to claim 1, wherein the radiation structure has a rectangular outline, and the first opening is a rectangular opening.

10. The antenna according to claim 1, wherein taking a straight line which is in a length direction of the antenna and passes through the center of the first opening as a symmetry axis, the first feeding structure and the second feeding structure are symmetrical to each other.

11. The antenna according to claim 1, wherein the at least one first opening comprise $2^n$ number of the first openings, the first feeding structure comprises n stages of third feeding lines, and the second feeding structure comprises n stages of fourth feeding lines;

one third feeding line at a $1^{st}$ stage is connected to two adjacent first feeding lines, and the first feeding lines connected to different third feeding lines at the $1^{st}$ stage are different; one third feeding line at an $m^{th}$ stage is connected to two adjacent third feeding lines at an $(m-1)^{th}$ stage, and the third feeding lines at the $(m-1)^{th}$ stage connected to different third feeding lines at the $m^{th}$ stage are different;

one fourth feeding line at a $1^{st}$ stage is connected to two adjacent second feeding lines, and the second feeding lines connected to different fourth feeding lines at the $1^{st}$ stage are different; one fourth feeding line at an $m^{th}$ stage is connected to two adjacent fourth feeding lines at an $(m-1)^{th}$ stage, and the fourth feeding lines at the $(m-1)^{th}$ stage connected to different fourth feeding lines at the $m^{th}$ stage are different; wherein n is greater than or equal to 2, m is greater than or equal to 2 and less than or equal to n, and both m and n are integers; and at least one of the third feeding line and the fourth feeding line is a microstrip line.

12. The antenna according to claim 1, wherein the antenna is divided into a feeding region and a radiation region; the first feeding structure and the second feeding structure are in the feeding region; the at least one radiation structure is in the radiation region; the first electrode further has at least one second opening in the feeding region; and an orthographic projection of the at least one second opening on the dielectric layer does not overlap orthographic projections of the first feeding structure and the second feeding structure on the dielectric layer.

13. The antenna according to claim 1, wherein the dielectric layer is of a single layer structure, and a material of the dielectric layer comprises polyimide or polyethylene terephthalate.

14. The antenna according to claim 1, wherein the dielectric layer comprises a first dielectric sub-layer, a first adhesive layer, and a second dielectric sub-layer which are stacked together; and the first electrode is on a side of the first dielectric sub-layer away from the first adhesive layer; the second dielectric sub-layer is arranged on a side of the first adhesive layer away from the first dielectric sub-layer; and the radiation structure is on a side of the second dielectric sub-layer away from the first adhesive layer.

15. The antenna according to claim 14, wherein a material of the first dielectric sub-layer and/or the second dielectric sub-layer comprises polyimide or polyethylene terephthalate.

16. A communication system comprising the antenna according to claim 1.

17. The communication system according to claim 16, further comprising:

a transceiving unit configured to transmit or receive a signal;

a radio frequency transceiver, which is connected to the transceiving unit and configured to modulate the signal transmitted by the transceiving unit or demodulate a signal received by the antenna and then transmit the signal to the transceiving unit;

a signal amplifier, which is connected to the radio frequency transceiver and configured to improve a signal-to-noise ratio of the signal output by the radio frequency transceiver or the signal received by the antenna;

a power amplifier, which is connected to the radio frequency transceiver and configured to amplify a power of the signal output by the radio frequency transceiver or the signal received by the antenna; and a filtering unit, which is connected to the signal amplifier, the power amplifier and the antenna, and configured to filter the received signal and then transmit the filtered signal to the antenna or filter the signal received by the transparent antenna.

18. A method for manufacturing an antenna, comprising:

providing a dielectric layer;

forming a pattern comprising a first electrode on a side of the dielectric layer through a patterning process, wherein a first opening is formed in the first electrode; and forming at least one radiation structure, at least one first feeding line and at least one second feeding line on a side of the dielectric layer opposite to the first electrode;

wherein an orthographic projection of a respective radiation structure of the at least one radiation structure on the dielectric layer is within an orthographic projection of a corresponding first opening on the dielectric layer; and the respective radiation structure is electrically connected to a corresponding first feeding line of the at least one first feeding line and a corresponding second feeding line of the at least one second feeding line; and taking a straight line which is in a length direction of the antenna and passes through a center of the first opening as a symmetry axis, the corresponding first feeding line and the corresponding second feeding line, which are connected to the respective radiation structure, are symmetrical to each other, wherein the antenna further comprises a first feeding structure and a second feeding structure, each on the side of the dielectric layer away from the first electrode, wherein the first feeding structure is electrically connected to the at least one first feeding line, and the second feeding structure is electrically connected to the at least one second feeding line; and the first feeding structure is in a same layer as and is electrically connected to the at least one first feeding line; and the second feeding structure is in a same layer as and is electrically connected to the at least one second feeding line.

* * * * *